United States Patent [19]
Bissonette

[11] 3,816,954
[45] June 18, 1974

[54] FREE LINE DOWN RIGGER RELEASE

[76] Inventor: Kenton E. Bissonette, 1425 Shubet, Holt, Mich. 48910

[22] Filed: Jan. 24, 1973

[21] Appl. No.: 326,429

[52] U.S. Cl. .......... 43/43.12, 24/201 A, 24/201 TR
[51] Int. Cl. ...................... A01k 91/00, A01k 95/00
[58] Field of Search............ 43/43.12, 42.05, 43.11; 24/115 F, 201 A, 201 TR

[56] References Cited
UNITED STATES PATENTS

| | | | |
|---|---|---|---|
| 2,932,115 | 4/1960 | Dunn | 43/43.12 |
| 3,229,408 | 1/1966 | Kohfield | 43/43.12 X |
| 3,643,370 | 2/1972 | Cook | 43/43.12 X |
| 3,659,370 | 5/1972 | Ritter | 43/43.12 |
| 3,710,501 | 1/1973 | Ware, Jr. | 43/43.11 |

Primary Examiner—Hugh R. Chamblee
Assistant Examiner—Daniel J. Leach
Attorney, Agent, or Firm—Miller, Morris, Pappas & McLeod

[57] ABSTRACT

A down rigger release for clean line fishing and including a gripping or clamping element securable to a wet line at or above the position of the weight. The clamping means has jaws which close on a bead element that normally slides freely up and down a lure line or fishing line and the bead, on insertion between the jaws in the gripping means, is releasably fixed in relation to the weight line. Upon fastening the bead element to the gripping element, several turns of lure line are made around the bead as by twisting the bead. On a strike or snag, the bead is jerked free of the gripping element and the turns in the line unwind so that the bead is freed to travel up and down the lure line and free from the weight line.

4 Claims, 8 Drawing Figures

PATENTED JUN 18 1974 3,816,954
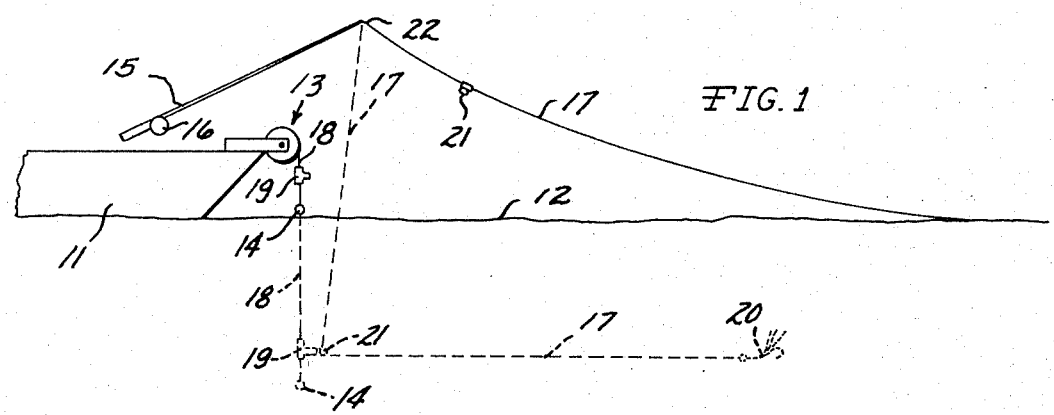
FIG.1
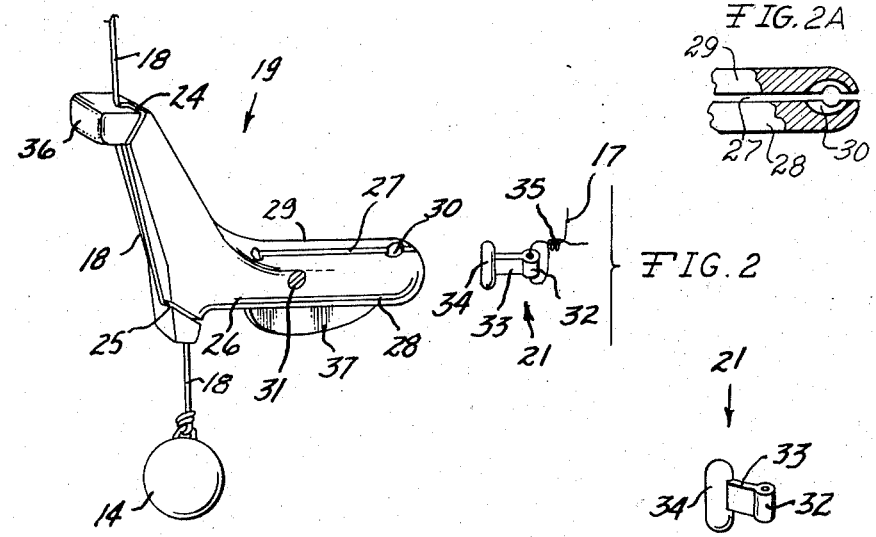
FIG.2
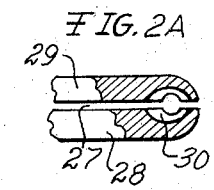
FIG.2A
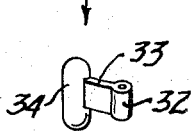
FIG.5
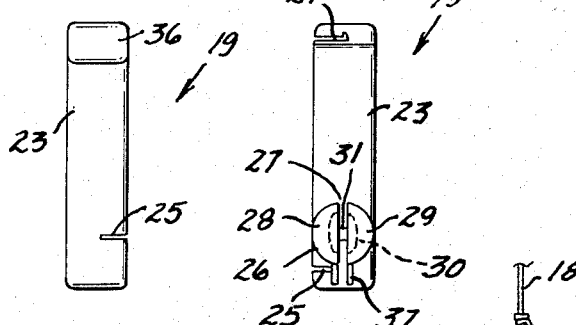
FIG.3  FIG.4
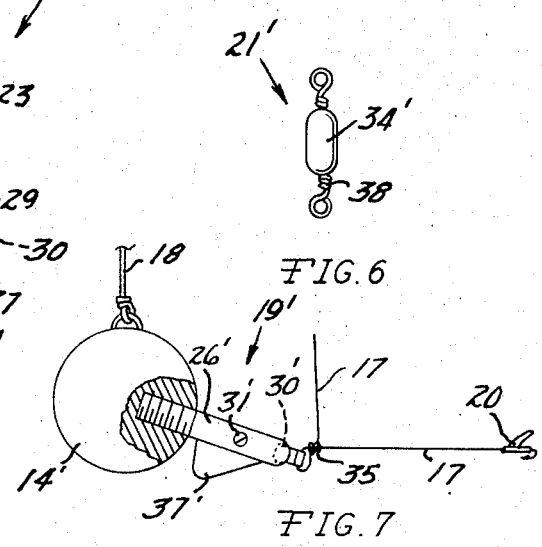
FIG.6
FIG.7

FREE LINE DOWN RIGGER RELEASE

BACKGROUND STATEMENTS

The present invention is directed to a fishing release device and more particularly to a fishing release which results in a wholly freed line with a running bead when the release or disconnect occurs. Wherever in fishing one employs the technique of trolling, it is important to sink the lure to a desired depth and then, in the instance of a strike, to free the fishing line from the sinking force so that the fisherman plays the fish free of the sinking device. This heightens the sport of landing a relatively large fish and in the present invention no obstruction is provided between the lure and the rod tip. This avoids interference during landing of the fish and avoids consequent likelihood of loss of the fish. Many devices have been provided which comprise releases or trips, but none of these satisfactorily meets the requirements of modern trolling using relatively lightweight tackle, even flies, trolled at substantial depths. Examples of such fishing are found now in the Great Lakes as well as in salt water fishing and the present invention is an outgrowth of the new fresh water sport fishing after Coho, Chinook, Rainbows, and specially bred trout and salmon crosses. The closest work seen in this field is identified in the U.S. Pat. Nos. 2,858,637 to Stark; 2,667,008 and 2,735,212 to Baum; 1,974,381 to Swanson; and 3,659,370 to Ritter.

The Ritter work exemplifies the general setting of release devices as applied to trolling but as can be seen, the concept in Ritter is to clamp on the fishing line. The device of applicant, by contrast, employs an intermediate element freely movable on the line until it is fixed as by twisting compression securing to a gripping element secured to the weight line. This trails a selected amount of line until a strike or snag occurs which frees the intermediate element or bead from the grasp of the gripping element. Thereupon the fishing line or lure line is freed from the weight and the intermediate element is loosed for free travel.

Accordingly, the principal object of the present invention is to provide a new and useful release structure which frees the fishing line from a weight line or planning line without actual attachment of line to the gripping element.

Another object is to provide a simple adjustable grip or clamp which is selectively attached to a releasable bead, and the bead, in turn, is secured freely around the fishing line.

Still another object is to teach a grip element which easily is selectively attached to a weight line and which is thereupon securable to a trailing fishing line in such a manner that an intermediate bead is capable of being freed from the gripping means and hence frees the line so that the line can be completely reeled in.

As will be appreciated by those skilled in the art, this adds a new dimension to fishing as by trolling and those skilled in the art will recognize other benefits and advantages as the description proceeds.

GENERAL DESCRIPTION

In fishing by trolling a lure beneath and behind a boat or in moving water behind a fisherman is contemplated by the setting of the present invention. A weight or sinker is provided on the end of a weight line. A gripper or connector element is applied to the weight line at or above the weight. Then, a lure line, separate from the weight line but parallel thereto on its vertical run, is also secured to the connector or gripper by means of a freely running slider or bead. A selected amount of lure line is measured off and the bead is twisted by winding the lure line over itself and the bead is then positioned in the gripper. The weight line is lowered carrying the lure line with it and the lure then trails behind the weight line from the connector or gripper and is separable from the weight line when tension on the trailing line exceeds the grip on the bead. Thus a "strike", for example, dislodges the bead and frees the lure line and in the same motion the bead is freed by untwisting so that it is movable up and down the lure line.

Hence, in general, the present invention comprises a pocketed gripping or compression clamping element and a slider element or bead having a portion forming an annulus through which a lure line is freely inserted. The pocket of the gripper is formed in the ends of limbs or jaws which close toward each other in forming the pocket. The pocket nestably receives the slider element and releases it when tension on the lure line causes withdrawal of the bead or slider from the pocket. The lure line is twisted around the slider or bead securing it from free movement until the bead element is jerked free of the pocket formed between the limbs. Preferably the compression on the bead imparted by the limbs or jaws is adjustable as by means applied to the limbs or jaws which increases or decreases the gripping force as needed by the style and depth of fishing. On release of the bead or slider, the twist in the line is shaken out and the slider is thus freed on the line and can travel up or down the line and presents no obstruction to the rod tip ahead of the lure connection.

IN THE DRAWINGS

FIG. 1 is a somewhat schematic side elevation view of a boat employing the present invention in trolling at a fixed depth and indicating in phantom the rigging prior to disengagement of lure line from weight line, and in full line showing the slider element freely movable on the separated lure line.

FIG. 2 is an exploded perspective view of a connector and gripper element in accord with the present invention on a weight line and indicating the slider element or bead at a selected position of the lure line and with the lure line twisted to secure the lure line at the bead for clamping attachment.

FIG. 2A is a slightly enlarged fragmental top plan view of the connector seen in FIG. 2 and showing only the bifurcated portion at the pocket.

FIG. 3 is an end elevation view of the connector and gripper element as seen in FIG. 2 and from the weight rigging side of the structure.

FIG. 4 is an end elevation view of the structure of the FIG. 2 seen from the jaw side of the structure.

FIG. 5 is a perspective view of the bead shown in FIG. 2 divorced from the lure line.

FIG. 6 is a barrel swivel utilizable as a bead for attachment to a lure line.

FIG. 7 is a side elevation view of a modified version of the structure seen in FIG. 2 and partially cut away to reveal the connection of the jaw element to the weight.

SPECIFIC DESCRIPTION

Referring to the drawing and with particularity to the

FIG. 1 thereof, a fishing boat 11 is shown on the surface 12 of fishing water and the boat 11 is equipped with a down rigger reel 13 by which means a weight 14 is selectively lowered beneath the surface 12 of the water. Separately, a fishing pole or lure line support 15 is in the boat 11 and may be in the hands of a fisherman or socketed on the boat 11 ready for use when a strike occurs. The fishing rod 15 includes a lure line reel 16 which serves as a receptacle for the fishing line or lure line 17. The weight line 18 on the down rigger reel 13 supports the weight 14 and allows the weight 14 to be lowered below the surface of the water 12 to any selected fishing depth. As shown, a gripper element or connector 19 is secured at or above the weight 14 on the weight line 18, and the distance between the weight 14 and the gripper or connector element 19 on the line 18 establishes the depth of trolling above the weight 14, hence, for example, if bottom weeds are encountered, the lure 20 on the lure line 17 is towed at an elevation above the bottom depth and above the crest of the weeds. This type of a rig substantially eliminates a great amount of snagging and places the lure 20 where the fisherman desires it to be. In phantom line, the lure line 17 is secured to the gripper element 19 by means of a slider element or bead 21 as will be hereinafter better appreciated. When a fish strikes the lure 20 the bead 21 is disconnected from the gripper element 19 and the lure line 17 is wholly disassociated from the weight line 18 and as will be seen, the slider bead 21 is then freely movable and slidable on the lure line 17 between the lure 20 and the rod tip 22. This allows retrieval of the lure line separate from the weight line and allows the fisherman to enjoy the pleasures of landing the "big one" free of the heavy weight 14. The line 17 is free of obstructions, and the slider or bead 21 can be selectively relocated on the gripper element 19 to adjust the amount of trailing lure line 17 and to select the depth of fishing by adjustment of the position of the gripper element on the weight line 18.

In the FIG. 2, the gripper element or connector 19 is shown selectively positioned on the weight line 18 preliminary to being lowered into the water 12. The gripper 19 is located at or above the weight 14 and the transverse slots 24 and 25 in the arm 23 of the gripper element 19 allow secure connection of the gripper element 19 to the weight line 18 without the necessity for tying or special rigging. The upper transverse groove 24 is a diagonal transverse slot through the arm 23 which binds on the line 18 after the weight line 18 is inserted in the groove 24 and tension is applied thereto. A lower groove 25 is a transverse slot diagonally through the gripper element 19 at the lower end thereof in the arm 23 and when the weight line 18 is passed into this slot 25 the gripper element 19 is stabilized in its position on the weight line 18 so long as the weight 14 imposes tension on the line 18 between the weight 14 and the reel 13. The more tension in the line 18 the more secure the binding of the gripping element 19 to the weight line 18. For facility in handling the weight line 18 between the slots 24 and 25, the arm 23 is provided with a slight bow. As can be seen by reference to the FIG. 2, the general configuration of the gripper element in its preferred form is L-shaped and the horizontal arm 26 of the L-shaped gripping element is bifurcated for a substantial amount of its length. The bifurcation 27 thus forms a pair of compression limbs or jaw elements 28 and 29 and in opposed register with each other and spaced apart from each other and including a formed pocket 30 therebetween which, as will be seen, can be opened and closed in accordance with the resiliency of the material forming the gripper element, as for example, resin sold under the trademarks Delrin, or Nylon (trademarks of the E. I. DuPont de Nemour Company) or polyethylene, polystyrene, and the like. Compression between the limbs 28 and 29 is also mechanically adjusted. The jaws 28 and 29 are moved toward and away from each other by means of a screw 31 which upon turning draws the jaws 28 and 29 closer together or forces the jaws 28 and 29 open to adjust the compression force of the jaws 28 and 29 and pocket 30 as will be seen. The slider bead 21 comprises an annulus 32, a connecting neck portion 33 and a knob portion 34. The knob portion 34 is smoothly configured to match with the pocket 30 formed in the jaws 28 and 29. As shown, the knob portion 34 is spherical or spheroidal for smooth engagement and disengagement in the pocket 30. The lure line 17 is passed through the annulus 32 so that the bead structure 21 is freely movable on the lure line 17. However, by twisting the slider bead element 21, the line 17 is twisted on itself on convolutions 35 so that when the knob portion 34 is inserted in the pocket 30 the line 17 is secured at the bead 21 and to the gripper element 19 until tension in the line 17 overcomes the grip on the knob portion 34 in the pocket 30 as by a strike or snag.

In the FIG. 3 the construction of the gripper element 19 is best seen and is formed from molding in a resin material and the limb or arm 23 is best appreciated along with the toe 36 which with the slots 24 and 25 assures firm location of the connector 19 on the weight line 18. In FIG. 4 the jaws 28 and 29 are best understood and the pocket 30 is appreciated between the jaws 28 and 29 and the jaws 28 and 29 are appreciated as movable toward and away from each other by the screw element 31 and by the aforementioned resiliency in the compression limbs 28 and 29. The keel elements 37 depend vertically from the jaws 28 and 29 for substantially the length of the bifurcation 27 and stabilize the gripping element in avoidance of flapping and chattering on the weight line 18. In FIG. 5 the slider bead 21 is appreciated from a slightly different perspective point of view, and it will be appreciated that other configurations, aside from the ovoid shown may be satisfactorily used in the knob portion 34.

In FIG. 6 a simple barrel swivel having a central knob portion 34' can be used satisfactorily as a bead 21'. Other configurations grippable by the pocket 30 or 30' and including means for free-running on the lure line 17 are satisfactory.

In the FIG. 7 a modified version of the gripper or connector element is indicated as attached directly to the weight 14' secured to the end of the weight line 18. Here the gripper element 19' is merely a threaded extension of the bifurcated leg 26' which forms the jaw elements in support of a bead 21 or 21' gripped in the pocket 30'. As previously described, the bead 21 or 21' is slidably on the lure line 17 and one or more keels 37' depend from the leg 26' to provide running stability for the connector gripper element 19'. The operation of the modification seen in FIG. 7 is substantially identical to the operation of the structure of FIG. 2 and compression on the bead 21 or 21' is accomplished by adjusting the screw 31'. From a functional point of view the modification of the gripper 19' limits the position of the lure 20 in trailing the weight 14'.

In operation, the release from the gripper 19 or 19' is selectively adjusted and the resulting sensitivity assures more strikes and enjoyable fishing. The bead 21 or 21', when not secured in the pocket 30 or 30', is freely movable on the lure line 17 so that the performance of rod 15 and lure line 17 is unimpeded and the rigging for trolling is simple in relationship to the positioning of the bead 21 on the weight line 18 and in selecting the trailing distance between the bead 21 and the lure 20.

Having thus described the present invention and the modifications thereof, others skilled in the art will appreciate additional modifications, changes and improvements and such additions, modifications, changes and improvements are intended to be included herein limited only by the scope of the hereinafter appended claims.

I claim:

1. A clean line variable compression trip release for fishing and the like comprising:
    a weight line;
    a gripping element secured to said weight line;
    threaded means for closing or opening said gripping element;
    a lure line;
    a lure line attached bead element slidable on said lure line and nestable in said gripping element; and
    a twist at said bead at a selected position on said lure line, said twist eliminated by tension when said bead is released from said gripping element.

2. A clean line variable compression trip release for fishing and the like comprising:
    a weight line;
    a gripping element having at least one bifurcated and pocketed limb extending therefrom and a weight line tether;
    threaded means for selectively opening and closing said bifurcated and pocketed limb;
    a fishing line; and
    a bead slidable on said fishing line adjustably secured to said fishing line by twisting said bead at a selected position on said fishing line, said bead being selectively secured in said pocket portion of said limb between said bifurcations and upon release therefrom untwisting and freeing said bead from said gripping element and said bead thereupon sliding on said line.

3. A connector, selectively disconnectable between a lure line and a weight line comprising:
    a lure line;
    a slider element on said lure line and through which said lure line is freely movable until said slider element is twisted on said lure line;
    compression limbs securable to a weight line on one side and secured to said slider element in a releasable grip whereby said lure line may be jerked free of said limbs upon strike or snag overcoming the grip of the compression limbs impinging on said slider and untwisting said slider element for free movement on said lure line.

4. A method for clean line down rigger fishing comprising:
    attaching a sliding element to a lure line so that said sliding element is freely movable in respect to said lure line;
    twisting the slider element on said lure line;
    connecting said slider element to compression limbs mounted on a weight line in a non-twisting relation to said weight line in a releasable grip whereby a selected pull on the lure line is required to accomplish disconnect of said lure line from said weight line; and
    upon selected disconnect of said slider element from said compression limbs on said weight line allowing an untwisting action by tension in said lure line whereby said slider upon release is freely movable along said lure line.

* * * * *